United States Patent [19]
Aladiev et al.

[11] 3,938,592
[45] Feb. 17, 1976

[54] ROCK-EXPLOITATION METHOD BASED ON THERMODYNAMIC CYCLES UTILIZING IN-SITU ENERGY SOURCE

[76] Inventors: Ivan Timofeevich Aladiev, ulitsa Georiu-Dezh, 3, kv. 11; Kirill Dmitrievich Voskresensky, Komsomolsky prospekt, 14/1, kv. 79, both of Moscow; Gennady Petrovich Gukov, ulitsa Lesneya, 6, kv. 13, Moskovskaya, poselek Vidnoe; Evgeny Valentinovich Saperov, poselok Moskvorechie, 52, kv. 4; Valery Kombolatovich Fardzinov, both of Moscow, all of U.S.S.R.

[22] Filed: Nov. 12, 1973

[21] Appl. No.: 414,772

Related U.S. Application Data

[63] Continuation of Ser. No. 122,483, March 9, 1971, abandoned.

[30] Foreign Application Priority Data

Mar. 23, 1970  U.S.S.R. .............................. 1416581

[52] U.S. Cl. ................................ 166/299; 166/302
[51] Int. Cl.² E21B 43/26; E21B 43/24; F28D 21/00
[58] Field of Search ...... 165/45; 166/302, 299, 303, 166/314, 57; 60/641

[56] References Cited
UNITED STATES PATENTS

| | | | |
|---|---|---|---|
| 1,422,204 | 7/1922 | Hoover et al. .................. | 166/299 X |
| 2,281,801 | 5/1942 | Reynolds et al. ................ | 166/306 |
| 2,584,605 | 2/1952 | Merriam et al. ................. | 166/258 X |
| 3,072,187 | 1/1963 | Carr ............................... | 166/258 |
| 3,354,952 | 11/1967 | Engle ............................. | 166/269 X |
| 3,470,943 | 10/1969 | Van Huisen ..................... | 165/45 |
| 3,493,050 | 2/1970 | Kelley et al. .................... | 166/302 X |
| 3,498,381 | 3/1970 | Earlougher, Jr. ................. | 166/303 |

FOREIGN PATENTS OR APPLICATIONS 625,020  9/1961  Italy ................................ 166/269

*Primary Examiner*—Stephen J. Novosad

[57] ABSTRACT

A rock-exploitation method based on thermodynamic cycles utilizing an in-situ energy source, which includes sinking at least one well as far down as, or deeper than a producing horizon, admitting stratal fluid into the well, discharging the fluid from the well above or below the producing horizon, and injecting a heat-carrying agent into the well where it circulates and exchanges heat with the rock through the fluid which is in contact with the rock and acts as a heat-carrying agent in an underground circuit including said means for admission of fluid, a section of the well between the fluid inlet and the fluid outlet, and the fluid-permeable rock mass adjacent to said section of the well.

8 Claims, 5 Drawing Figures

ROCK-EXPLOITATION METHOD BASED ON THERMODYNAMIC CYCLES UTILIZING IN-SITU ENERGY SOURCE

This is a continuation of application Ser. No. 122,483, filed Mar. 9, 1971, now abandoned.

The present invention relates to rock-exploitation methods and, more particularly, to rock-exploitation methods based on thermodynamic cycles utilizing an in-situ energy source, and apparatus for the realization of this method.

The invention may be utilized for the recovery of geothermal energy, that is, the natural heat of rocks carried by stratal fluids and also for cooling heat-carrying agents abstracting low-potential thermal energy from various industrial processes.

By "an in-situ energy source" is meant a negative source if the process results in a decrease of the temperature of the heat-carrying agent, and a positive source if the process results in an increase in the temperature of the heat-carrying agent due to heat exchange with the fluid.

It is a well known fact that more than half of the energy utilized in the world comes from oil and gas. However, the reserves of the known types of fuel are limited and distributed non-uniformly or occur in uninhabited and hard-to-reach localities. This poses the problem of searching for and utilizing other types of fuel, and also the problem of utilizing the heat stored in the earth's crust.

Known in the art are methods and apparatus for utilizing geothermal energy and its employment in industry and public utilities.

In the exploitation of rocks for the purpose of recovery of geothermal energy by means of a thermodynamic cycle utilizing a positive in-situ energy source, at least one well is sunk to pump into the hot rocks a quantity of cold water which is heated and turns to steam to be conveyed by wells to an on-surface turbine. To improve circulation and to increase the surface of heat exchange, a number of nuclear explosions are set off in the rock mass.

In this method, the danger always exists that radioactive products may come to the surface or that the water fed underground may be lost irretrievably because the column of liquid has a high hydrostatic pressure and the underground boiler formed by the fractured hot rock is subject to leak.

Increasing the temperature of the heat-carrying agent promotes dissolution of the mineral salts contained in the rock, an undesirable development as the salts tend to deposit on the pipes and clog the turbine.

The above-mentioned disadvantages necessitate provision of a reserve supply of heat-carrying agent, treatment of water, and radiation shielding, which add to the cost of the apparatus.

Also, in the case of a low piezometric level relative to the day, an additional amount of energy has to be expended to lift or displace the hot heat-carrying agent from the said level of the day, which likewise adds to the unproductive costs and reduces the efficiency of the plant as a whole.

The above-mentioned disadvantages are the key ones and may in some cases stand in the way of realizing a particular project.

The foregoing does not apply to rock with lower temperatures, considerable water content and natural permeability, such as occur in most areas with deposits of geothermal water.

The recovery of geothermal energy in such cases is handicapped by the low permeability of producing collectors, the limited reserves of geothermal water and, very often, the high content of mineral salts which results in the partial or complete clogging of the walls.

It should also be noted that the prior-art method involving continuous withdrawal of geothermal water without its return to the source stratum upsets the water balance of the producing horizon. As a result, resort must be made to the area exploitation of the deposit with a large number of wells to be sunk and, as a consequence, a limited depth to which hydrothermal horizons are exploited.

Known in the art are also other methods of the recovery of geothermal energy from existing thermal springs. As a rule, however, these springs are far removed from major energy consumers, and this limits their large-scale utilization.

An object of the invention is to provide a rock-exploitation method based upon thermodynamic cycles utilizing an in-situ energy source and an apparatus for realization of the method which enhances the reliability and serviceability of geothermal plants and cuts down the time required for their commissioning.

With this and other objects in view, the invention is concerned with a rock-exploitation method based on thermodynamic cycles utilizing an in-situ energy source. At least one is sunk as far at least as a producing horizon and stratal fluid is admitted into the well. According to the invention, the fluid is discharged from the well above or below the producing horizon, and a heat-carrying agent is injected into the well where it circulates up and down the well bore and exchanges heat with the rock through stratal fluid which is in contact with the rock and acts as a heat-carrying agent in an underground circuit including means for admission of stratal fluid into the well, a section of the well as far down as the fluid outlet, within which it exchanges heat with the heat-carrying agent, and fluid-permeable rock mass adjacent to this section of the well.

The temperature of the heat-carrying agent may be lower or higher than that of the fluid.

The fluid-permeable rock mass may be produced above or below the producing horizon or both above and below, by at least one underground explosion, and fluid from the producing horizon is fed down the well bore to the point of discharge located within the explosion-fractured zone.

It is preferable to set off at least one explosion in the producing horizon in order to increase the permeability of rock and improve the circulation of stratal fluid in the rock mass of the producing horizon.

In some cases, it may be preferable to sink at least one inclined well to facilitate the discharge of the spent fluid into low-permeability rock.

By the term "producing horizon" there is meant naturally heated or cold layers of rock with fluid confined in them, including a water-saturated or watered rock.

The above-listed features of the present invention provide a rock-exploitation method for rock whose permeability may range between zero and high naturally occurring values, realizable in practically any locality where the demand exists for heat, electricity, or cold, owing to its applicability under a wide range of geological and hydrogeological conditions.

An advantage of the present invention is that rock exploitation does not entail any changes in the material and energy balance of the earth's crust.

The invention will be more fully understood from the following description of preferred embodiments based on a thermodynamic cycle with a positive in-situ energy source, when read in connection with the accompanying drawings wherein.

Figure 1:
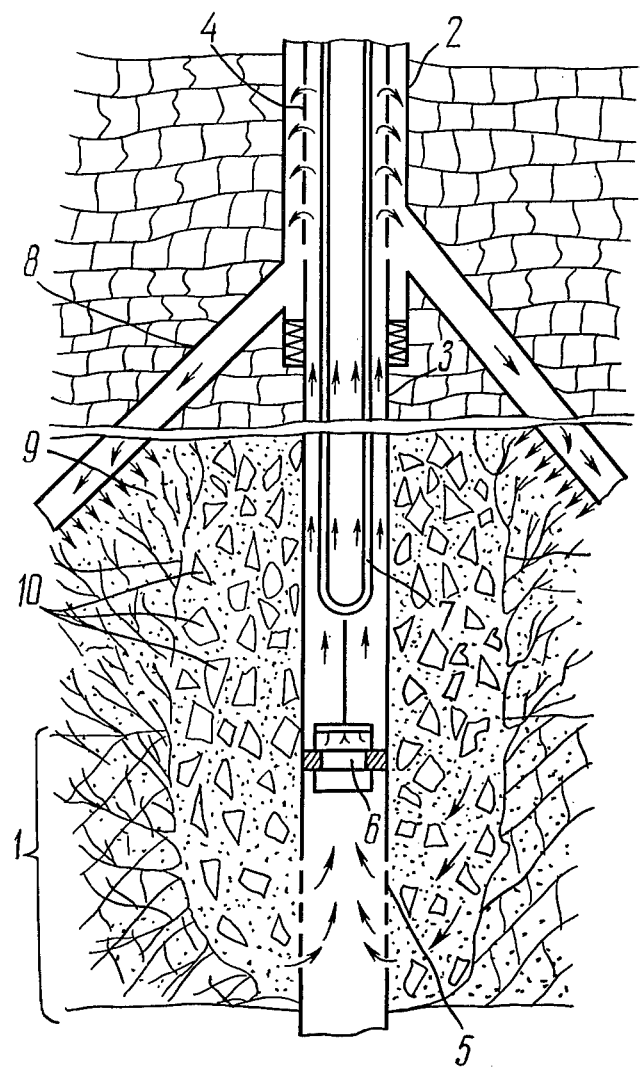
FIG. 1 shows an elevational view of apparatus for the recovery of geothermal energy, according to the invention.

According to the method and apparatus disclosed herein, stratal fluid is admitted into a well where it circulates in the bore, exchanges heat with the heat-carrying agent, and is discharged from the well into the surrounding rock mass of high permeability and intake capacity, above or below the producing horizon from which it was taken. The discharged fluid flows along and across the stratal, traverses a large volume of permeable rock, and goes back to the inlet of the well, having changed its heat content on the way owing to contact with the rock and completing an underground closed circuit. As is seen, stratal fluid is free to circulate in rock, and exchanges heat with a heat-carrying agent without being lifted to the surface and, as a consequence, without any changes in its aggregate state and in the stratal environments. This is especially important in cases where geothermal energy is recovered from deep-lying hot rock and also facilitates the maintenance of wells and elimination of clogging which may occur in highly mineralized geothermal deposits. Furthermore, there is no danger of radioactive fall-out and of radioactive contamination of the surface plant.

In cases where the heat-carrying agent gives up its heat, stratal fluid circulates in the same underground closed circuit. At shallow depths and when stratal fluid is low-mineralized pure water, heat exchange between the heat-carrying agent and fluid may be conducted outside the well reaching the producing horizon, but the spent fluid should be discharged as before.

A stratum is a complex geological and hydrogeological system widely differing and varying in permeability, water content, temperature and other vital properties not only with height, but also along the strike.

Owing to this, an explosion set off in a particular place of a stratum improves the filtration characteristics of the stratum, at least within the explosion fractured zone.

In the case of low-permeability crystalline formations the recovery of geothermal energy is practically impossible without first creating favourable conditions for the circulation of stratal fluid.

The permeable rocks of a sedimentary mantle may likewise require underground explosions in order to improve the intake capacity of the wells and the filtration properties of the strata.

By properly varying the number and yield of explosions, it is possible to utilize with advantage all potentialities and features of a given formation for better circulation of stratal fluid and its heat exchange with as large a volume of rock as possible.

Stratal fluid is a natural heat-carrying agent of specific thermal and physical properties, carrying various amounts of dissolved salts, gases and harmful impurities. As its temperature changes, its density also changes. Thus, if the temperature of stratal fluid is higher than that of the heat-carrying agent, the cooled fluid should preferably be discharged below its intake. Conversely, if the temperature of stratal fluid is lower than that of the injected heat-carrying agent, it should preferably be discharged above its intake. In practice, cases may be encountered in which stratal fluid will have to be discharged the other way around, contrary to the principles set forth above.

The choice of a heat-carrying agent to be injected into the well depends on the nature and demands of the utilizing plant and also on whether it is to receive or give up heat from or to the fluid by way of heat exchange. The zone of the thermodynamic cycle to be used for interaction between stratal fluid and the injected heat-carrying agent is selected according to the specific service conditions and the requirements of the utilizing plant. If the thermodynamic cycle involves the recovery of geothermal energy and its transfer to the surface or higher strata, heat exchange is effected in the well bore between the fluid inlet and outlet. If the cycle involves the cooling of the injected heat-carrying agent and the depth of the well is insufficient for an effective heat exchange between the injected heat-carrying agent and fluid, this zone may be removed from the well into, say, a working area on the surface. In this case, stratal fluid is discharged and circulates as described earlier. In the general case, when the fluid and heat-carrying agent are identical in nature, they may be merged together to form a single heat-carrying agent within a particular zone of thermodynamic interaction.

Since the apparatus disclosed herein provides for the circulation of the heat-carrying agent without any loss within the heat-exchange zone in the well and the agent can be injected from the surface, the method disclosed herein may be used over a wide range of depths from a few meters to the limit set by the present-day state of the drilling art.

Variables such as the layout of geothermal plant, the number, diameter and depth of development wells, the type, surface and length of a heat-exchanger, flow rates of fluid and heat-carrying agent, the capacity of the underground boiler, and other particulars can be chosen to suit the hydrogeological and geothermal conditions of each particular locality. For a specified duration of operation, the maximum energy output depends on the initial temperature of the rock, the capacity of the pumps, the capacity of the underground boiler, and the available temperature differential. All of these variables can be determined for each particular case on the basis of technical and economical analysis.

The invention also provides an apparatus which comprises a well with a casing, sunk at least as far as a producing horizon, a string of exploitation pipes open at the bottom, means for admission of stratal fluid, and means for varying the heat content of the heat-carrying agent injected into the well to exchange heat with the fluid.

The means for admission of stratal fluid is a submersible pump which may be placed at the point where fluid is taken from the producing horizon. The means for varying the heat content of the injected heat-carrying agent is a heat-exchanger of, say, the surface type, which may be placed above the pump in the well.

An apparatus for the recovery of geothermal energy by the method disclosed herein is shown in FIG. 1. The apparatus, according to the invention, is placed in an area fractured by an underground explosion set off in a producing horizon 1. It comprises at least one well with a casing 2, said well being sunk and cased as far down as at least the producing horizon 1, and accommodating a string of exploitation pipes 3. The latter may be the casing 2 of the well, open at the bottom or perforated near the producing horizon. At the top and bottom of the bore of the well are located a fluid outlet 4 and a fluid inlet 5 the precise position of which depends on the specific geologic conditions. The fluid outlet 4 may be located above or below the producing horizon 1, while the fluid inlet 5 may be situated in highly permeable rocks surrounding the producing horizon 1. The fluid inlet 5 is equipped with means for admitting and transferring fluid in the well bore such as, for example, a submersible pump 6. A pump is to be chosen if the natural head of fluid in the producing horizon 1 is insufficient to lift it to the requisite height. Heat exchange between the fluid and heat-carrying agent is effected in a heat exchanger 7 which is placed in the string of pipes 3 of the well and in which the heat-carrying agent circulates.

The apparatus disclosed herein operates as follows:

Stratal fluid is withdrawn from the producing horizon 1 by the pump 6 and transferred up the well bore towards the fluid outlet 4 made in the form of perforations in the string of pipes 3, from which the fluid is discharged into the permeable rock surrounding the fluid outlet 4. If the surrounding rock is of low intake capacity, fluid is directed into inclined walls 8 which discharge it into the rock where the fluid seeps through cracks 9 and cavities between rock fragments 10. On coming in contact with a large volume of hot rock, the temperature of the cooled fluid rises again, and goes back to the fluid intake 5, thereby completing a closed underground circuit. The path of the fluid is shown by the arrows in FIG. 1.

As it moves in the string of pipes 3 of the well from the inlet 5 to the outlet 4, the fluid washes around the heat-exchanger 7 in which the heat-carrying agent is made to circulate, and cools, thereby changing its heat content.

Figure 2:
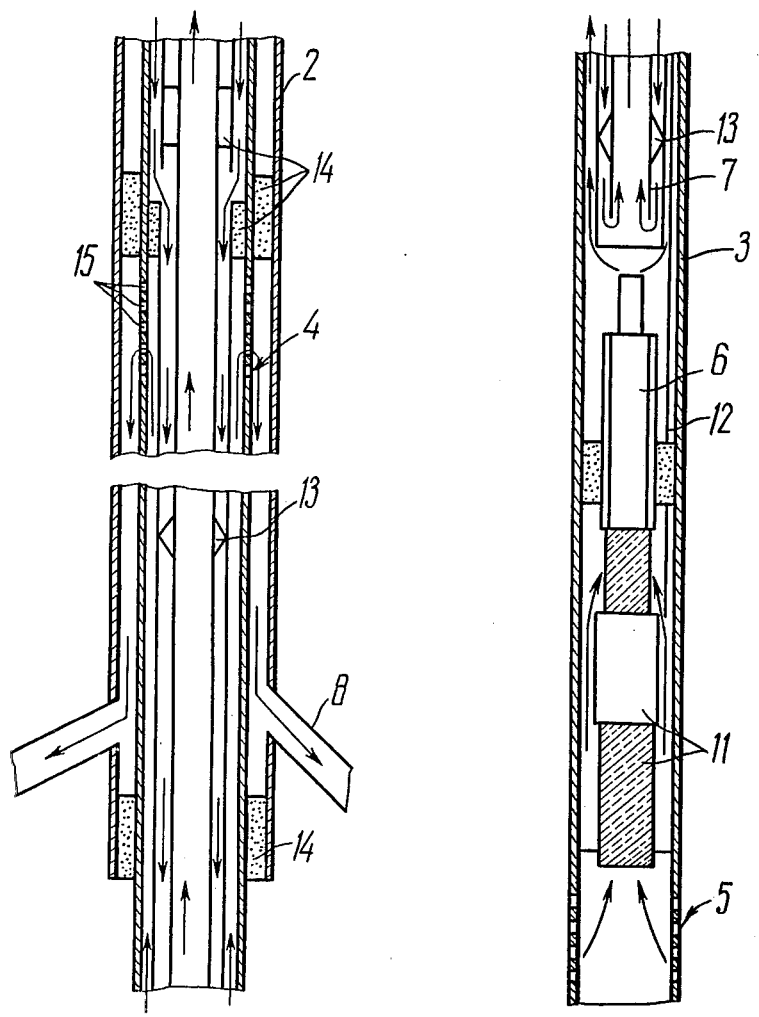
FIG. 2 shows a means in a well for heat exchange between the heat-carrying agent and stratal fluid, according to the invention.

The arrangement of the heat-exchanger 7 between the fluid inlet 5 and the fluid outlet 4 in the string of pipes 3 is shown in FIG. 2. In addition to the string of pipes 3, the fluid intake 5, and the fluid outlet 4, this section comprises a filter 11 to remove mechanical impurities from the fluid, control connections 12 of the submersible pump 6, the coaxial-tube heat-exchanger 7 centred in the bore of the well 2 by shanks 13, the inclined wells 8, and cement rings 14 to hold the various components of the apparatus in place and to guide the flow of the heat-carrying agent and fluid in the heat exchanger and also in the space between the heat-exchanger 7, the string of pipes 3, and the well.

At the fluid outlet 4, the string of pipes 3 has one or more perforations or drilled holes.

Figure 3:
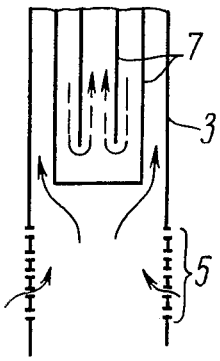
FIG. 3 shows the path of the fluid and heat-carrying agent within the heat-exchange section of the well, according to the invention.

The flow of the heat-carrying agent and fluid in an apparatus, according to the invention, is shown in FIG. 3. In FIGS. 2 and 3, the path of the heat-carrying agent is shown by the dashed lines and that of fluid by the solid lines.

The hot heat-carrying agent is then lifted to the utilizing equipment which may be either on the surface or in the rock mass. Heat losses which occur as the hot heat-carrying agent is lifted may be reduced by any of the prior-art methods, such as application of thermal insulating materials to the surface of the pipes or provision of an annular clearance filled with a gas or liquid of low thermal conductivity.

Figure 4:
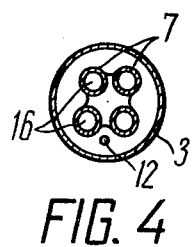
FIG. 4 shows the arrangement of a sectional heat exchanger across the well, according to the invention.

A cross-sectional view of a sectional heat-exchanger 7 is shown in FIG. 4. With this type of heat-exchanger, different heat-carrying agents may be fed to different sections 16, as the user may wish, for example, a liquid in one of the sections and a gas in the other.

Figure 5:
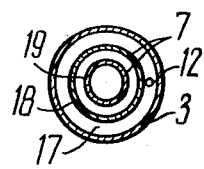
FIG. 5 shows the arrangement of a coaxial-tube heat exchanger across the well, according to the invention.

A cross-sectional view of a coaxial tube heat-exchanger 7 placed inside the string of exploitation pipes 3 is shown in FIG. 5. According to the invention, the cool heat-carrying agent is injected into the well through the external annulus 17 between the string of pipes 3 and the outer tube 18 of the heat-exchanger 7 and flows back in the inner tube 19. To reduce heat losses, the inner annulus between the tubes 18 and 19 may be filled with a gas or liquid of low thermal conductivity.

The fluid inlet and outlet are vital elements of the apparatus disclosed herein. These may be any devices, workings, or cavities, supplemented by appropriate measures ensuring the inflow and outflow of a sufficient amount of fluid, such as ducts formed by hydraulic fracturing, by washing out seams of soluble rocks of, say, the halogen type, or by structural fractures and faults; uncased or cased bores with perforations facing sufficiently permeable rocks of the sedimentary type or masses fractured by an explosion; inclined branches from the main well bore, which may be cased and perforated or uncased and sunk as far down as strata or masses fractured by explosions and capable of taking in the requisite amount of fluid; and explosion-fractured rocks. Under favourable conditions, that is, with high permeability and intake capacity of surrounding rocks, fluid may be discharged directly into the stratum through the perforations in the string of pipes by gravity, and fresh fluid may be admitted through the open-ended well bore or the perforations by means of a submersible pump or any other devices, or, in the case of high flow rates and pressure in the producing horizon, by self-inflow.

An application of the efficiency of the apparatus for the recovery of geothermal energy disclosed herein can be had from the following estimates:

The heat-exchange zone is limited to the fractured zone formed by an underground explosion. Heat is withdrawn from the entire volume of the zone. The inflow of heat from outside the said zone is nil. The heat liberated by the explosion is neglected. This is the most unfavourable case that may be encountered in practice. By the theory of heat transfer, the time, $\tau$, during which the initial heat differential decreases by 25 percent is given by $$\tau = -\ln 0.75 \, \frac{4/3 \, \pi r^3 \gamma \, C}{W}$$

where
  $r$ = radius of the fractured zone;
  $\gamma$ = density of the rock;
  $C$ = specific heat of fluid;
  $W$ = water equivalent of stratal fluid.

It is assumed that the explosion-fractured zone has a radius $r = 250$ to $300$ m and that the fluid inlet and outlet are removed from the point of the explosion the same distance.

Putting
$\gamma = 2.5 \times 10^3$ kg/m³
$C = 0.25$ to $0.30$ kcal/kg°C
$W = 0.1$ gcal/hr°C,
we find that $\tau =$ about 17 years.

In other words, the fluid circulating in the underground circuit can provide for the recovery of geothermal energy for a long period of time. Under the conditions assumed above, anywhere from $0.4 \times 10^{12}$ to $0.7 \times 10^{12}$ kcal of heat can be recovered from the earth's crust during this span of time.

The leading characteristics of the heat-exchanger can likewise be determined by the theory of heat transfer. Assuming that within the heat-exchange section the heat-carrying agent and fluid are in a counter-current flow, we choose the diameter of the well, the size of pipes and heat-exchanger tubes, the type of submersible pump, etc. to be such that with the heat-exchange section about 600 m long the currents of the heat-carrying agent and fluid will be approximately identical at a heat-carrying agent flow rate of $G = 100$ m³/hour, which corresponds to $W = 0.1$ gcal/hr °C. The heat-exchanger has one section for the heat-carrying agent and is, for simplicity, taken to be of the coaxial tube type in which the hot heat-carrying agent is lifted from the heat-exchange section in the inner tube adiabatically insulated at the top of the well bore.

According to the invention, the velocity of fluid in the string of pipes is 0.82 m/sec, which corresponds to a Reynolds number of $0.9 \times 10^5$. The velocity of the heat-carrying agent is 0.75 m/sec, which corresponds to a Reynolds number of $1.2 \times 10^5$.

Under the assumed conditions and with steel tubes, the coefficient of heat transfer between the fluid and heat-carrying agent is 900 kcal/m² hr °C, which corresponds to a heat-exchange surface area of 600 m².

With a fluid temperature of 100°C and with the heat-carrying agent having an inlet temperature of 10°C, the outlet temperature of the heat-carrying agent will be 86°C. When the flow rate of fluid is increased 1.5 times, the outlet temperature of the heat-carrying agent will rise to 92°C.

The above figures apply to an apparatus for the recovery of geothermal energy, using a relatively small explosion-fractured zone. As this zone is increased in size with all other conditions remaining unchanged, the output of heat and time of operation will increase in proportion. With a greater number and a larger diameter of wells sunk into a zone fractured by at least one explosion, it is possible to recover hundreds of gram-calories of heat an hour.

Further improvement in the efficiency of the invention may be attained by increasing the number of heat-exchanger sections for the heat-carrying agent, using a better material than steel for the pipes and tubes in the heat-exchange section, appropriately placing the fluid inlet and outlet, and through proper layout of the component units in the well bore.

If hot rocks do not carry stratal fluid, but there is stratal fluid in above-lying beds, or there is a lake, a river and the like on the surface, it is possible to inundate an explosion-fractured zone in a horizon of low-permeability hot rock. This can be done by any of the prior-art methods, with fluid being injected either outside the string of pipes, or down the well itself, or through a working area.

The meaning of the invention will not change if the upper and lower perforated sections of the pipe string are used the other way around (that is, the upper end as an inlet and the lower end as an outlet. Additional modifications may be made so that, for example, pumps are used for admitting stratal fluid in the well bore, different spacing and location are adopted for these means (at the lower or upper perforated section of the pipe string); the heat-carrying agent is lifted to the surface or utilized underground; the spent but still sufficiently hot fluid is discharged into producing strata for the extraction of sulphur, oil and other mining purposes, with its return to the source horizon; two or more water takeoffs are provided on the same axis or in wells cluster-drilled from the well bore; a mine shaft or any other working area is used instead of the whole or part of the string of exploitation pipes; etc.

Any known types of high explosives may be used to produce a permeable zone in rock.

What is claimed is:

1. A rock-exploitation method based on thermodynamic cycles utilizing an in-situ energy source, comprising: sinking at least one well as far down as a producing horizon; admitting stratal fluid into said well; discharging said fluid from the well above the producing horizon into a fluid-permeable rock mass, said fluid being utilized as a heat-carrying medium in an underground circuit which includes means for admission of fluid into the well, a section of the well between a fluid inlet and a fluid outlet, and the fluid-permeable rock mass adjacent to said section of the well; injecting a heat-carrying agent into said well where it circulates, said heat-carrying agent exchanging heat with said fluid within said section of the well, said heat-carrying agent having a higher temperature than the stratal fluid.

2. A rock-exploitation method based on thermodynamic cycles utilizing an in-situ energy source, comprising: sinking at least one well deeper than the producing horizon; admitting stratal fluid into the well; discharging said stratal fluid from the well below the producing horizon into a fluid-permeable rock means, said fluid being utilized as a heat-carrying medium in an underground circuit which includes means for admission of fluid into the well, a section of the well between a fluid inlet and a fluid outlet, and the fluid-permeable rock mass adjacent to said section of the well; and injecting a heat-carrying agent into the well where it circulates, said heat-carrying agent exchanging heat with said fluid within said section of the well, said heat-carrying agent having a higher temperature than the stratal fluid.

3. A rock-exploitation method based on thermodynamic cycles utilizing an in-situ energy source, comprising sinking at least one well as far down as a producing horizon; admitting stratal fluid into said well, said fluid being contained in said rock and contacting same; discharging said fluid from the well above the producing horizon into a fluid-permeable rock mass, said fluid being utilized as a heat-carrying medium in an underground circuit which includes means for admission of fluid into the well, a section of the well between the fluid inlet and fluid outlet and the fluid-permeable rock mass adjacent to said section of the well; injecting a heat-carrying agent into said well where it circulates, said fluid transferring heat to said heat-carrying agent within said well section.

4. The method according to claim 3, comprising setting off in the producing horizon at least one underground explosion so as to obtain a rock mass highly permeable relative to the producing stratum; said rock mass separating the flows of hot and cold fluid by natural convection and a section of the well between the fluid inlet and the fluid outlet; and circulating said fluid through a large volume of rock from its outlet from said well to its inlet into the same well through the formed highly permeable rock.

5. A rock-exploitation method based on thermodynamic cycles utilizing an in-situ energy source, comprising sinking at least one well to a producing horizon; forcing a heat-carrying agent into said well and circulating it therethrough with an outlet to a consumer; at the same time, feeding the well with a fluid contained in rock of the producing horizon; said heat-carrying agent transferring heat from the rock of the producing horizon by means of the fluid forced into said well; discharging said fluid with a varied heat content into fluid-permeable rock; separating the flows of hot and cold fluid by means of natural convection and by means of the section of said well from the fluid inlet to the fluid outlet; and circulating said fluid from its outlet from said well through the permeable rock in the direction of its inlet into the same well, while restoring its initial heat content.

6. The method according to claim 5, comprising conducting at least one underground explosion in the producing horizon so as to form a rock mass permeable with respect to the producing strata; said rock mass separating the flows of hot and cold fluid by natural convection and by a well section between the fluid inlet and the fluid outlet; and circulating said fluid in a large volume of rock from its outlet from said well to its inlet into the same well through the formed highly permeable rock.

7. A rock-exploitation method based on thermodynamic cycles utilizing an in-situ energy source, comprising: sinking at least one well as far down as a producing horizon; admitting stratal fluid into said well, said fluid being contained in the rock and being in contact therewith; discharging said fluid from the well above the producing horizon into a fluid permeable rock mass, said fluid being utilized as a heat-carrying medium in an underground circuit which includes means for admission of fluid into the well; a section of the well between the fluid inlet and the fluid outlet, and the fluid-permeable rock mass adjacent to said well section; injecting a heat-carrying agent into said well where it circulates, the temperature of said heat-carrying agent being higher than the temperature of said fluid containing in the rock of said producing horizon; said heat-carrying agent being cooled by said fluid within said well section.

8. A rock-exploitation method based on thermodynamic cycles utilizing an in-situ energy source, comprising: sinking at least one well deeper than the producing horizon; admitting stratal fluid into the well, said fluid being contained in the rock and being in contact therewith; discharging said fluid from the well above the producing horizon into a fluid-permeable rock mass, said fluid being utilized in an underground circuit comprising said means for admission of the fluid into the well, a section of the well between a fluid inlet and a fluid outlet, and the fluid-permeable rock mass adjacent to said well section; injecting a heat-carrying agent into said well where it circulates, the temperature of said heat-carrying agent exceeding that of the fluid contained in the rock of said producing horizon, said heat-carrying agent being cooled by said fluid within said well section.

* * * * *